United States Patent
Olofsson et al.

(10) Patent No.: US 9,288,725 B2
(45) Date of Patent: Mar. 15, 2016

(54) METHOD FOR DETERMINING HANDOVER CRITERION IN A CELLULAR WIRELESS COMMUNICATION SYSTEM

(71) Applicant: Huawei Technologies Co., Ltd., Shenzhen (CN)

(72) Inventors: Henrik Olofsson, Stockholm (SE); Peter Legg, Stockholm (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/644,909

(22) Filed: Oct. 4, 2012

(65) Prior Publication Data

US 2013/0109389 A1    May 2, 2013

Related U.S. Application Data

(63) Continuation of application No. PCT/CN2011/076792, filed on Jul. 4, 2011.

(30) Foreign Application Priority Data

Dec. 23, 2010 (SE) .................. PCT/SE2010/000318

(51) Int. Cl.
H04W 36/00 (2009.01)
H04W 36/24 (2009.01)
H04W 36/16 (2009.01)

(52) U.S. Cl.
CPC .......... *H04W 36/0083* (2013.01); *H04W 36/24* (2013.01); *H04W 36/0016* (2013.01); *H04W 36/16* (2013.01)

(58) Field of Classification Search
CPC .......................... H04W 36/30; H04W 36/0083
See application file for complete search history.

(56) References Cited

U.S. PATENT DOCUMENTS

2006/0205436 A1* 9/2006 Liu et al. .................. 455/560
2007/0142051 A1 6/2007 Xu et al.
(Continued)

FOREIGN PATENT DOCUMENTS

CN    101346911 A    1/2009
CN    101395933 A    3/2009
(Continued)

OTHER PUBLICATIONS

International Search Report and Written Opinion issued in corresponding PCT Patent Application No. PCT/CN2011/076792, mailed Sep. 29, 2011.
(Continued)

*Primary Examiner* — Vladimir Magloire
*Assistant Examiner* — Shantell L Heiber
(74) *Attorney, Agent, or Firm* — Brinks Gilson & Lione

(57) ABSTRACT

The present invention relates to a method for determining handover criterion in a cellular wireless communication system, said cellular wireless communication system employing handover procedures according to which mobile stations may be handed over from a cell to another cell; said method comprising the steps of: receiving at least one handover control criterion parameter, and determining at least one handover criterion based on said at least one handover control criterion parameter. Furthermore, the invention also relates to a method in a network control entity, a method in a network entity, a computer program, a computer program product, a network control entity device, a network entity device and a cellular communication system comprising such devices.

23 Claims, 3 Drawing Sheets

(56) References Cited

U.S. PATENT DOCUMENTS

| | | | |
|---|---|---|---|
| 2009/0010226 A1 | 1/2009 | Nishimura et al. | |
| 2009/0163223 A1* | 6/2009 | Casey | 455/453 |
| 2010/0002603 A1* | 1/2010 | Gupta et al. | 370/254 |
| 2010/0035633 A1* | 2/2010 | Park et al. | 455/456.1 |
| 2010/0226339 A1* | 9/2010 | Stephenson et al. | 370/332 |
| 2010/0309885 A1* | 12/2010 | Matsumoto | 370/332 |
| 2011/0059741 A1* | 3/2011 | Klein | 455/436 |
| 2012/0026918 A1* | 2/2012 | Won et al. | 370/255 |
| 2013/0301617 A1* | 11/2013 | Kuhn et al. | 370/331 |

FOREIGN PATENT DOCUMENTS

| | | |
|---|---|---|
| CN | 101500286 A | 8/2009 |
| CN | 101909313 A | 12/2010 |

OTHER PUBLICATIONS $3^{rd}$ Generation Partnership Project, "Technical Specification Group Radio Access Network; Evolved Universal Terrestrial Radio Access (E-UTRA) Radio Resource Control (RRC); Protocol Specification" (Release 8) 3GPP TS 36.331. V1.0.0, Nov. 2007.

LTE, "$3^{rd}$ Generation Partnership Project, Technical Specification Group Radio Access Network; Evolved Universal Terrestrial Radio Access (E-UTRA) and Evolved Universal Terrestrial Radio Access Network (U-TRAN); Overall Description" Stage 2 (Release 9) 3GPP TS 36.300. V9.2.0, Dec. 2009.

LTE, "$3^{rd}$ Generation Partnership Project, Technical Specification Group Radio Access Network; Evolved Universal Terrestrial Radio Access (E-UTRA) and Evolved Universal Terrestrial Radio Access Network (U-TRAN); Overall Description" Stage 2 (Release 9) 3GPP TS 36.300. V9.6.0, Dec. 2010.

LTE, "$3^{rd}$ Generation Partnership Project; Technical Specification Group Services and System Aspects; Telecommunication Management; Self-Organizing Networks (SON) Policy Network Resource Model (NRM) Integration Reference Point (IRP); Information Service (IS)" (Release 9), 3GPP TS 32.522. V1.0.0, Mar. 2010.

LTE, "$3^{rd}$ Generation Partnership Project; Technical Specification Group Services and System Aspects; Telecommunication Management; Self-Organizing Networks (SON) Policy Network Resource Model (NRM) Integration Reference Point (IRP); Information Service (IS)" (Release 9), 3GPP TS 32.522. V9.1.0, Jun. 2010.

$3^{rd}$ Generation Partnership Project; Technical Specification Group Services and System Aspects; Telecommunications Management; Self-Optimization OAM; Concepts and Requirements (Release 9) 3GPP TS 32.521. V1.0.0, May 2009.

Qualcomm, "Performance Measurements for Handover Parameter Optimisation" Agenda 6.05.3, 3GPP TSG-SA5 (Telecom Management) Meeting SA5#60. Sophia Antipolis, France, Jul. 7-11, 2008. S5-081092.

Huawei, "OAM Control of MRO" Agenda Item 16.1. 3GPP TSG RAN WG3 Meeting #70bis, Dublin, Ireland, Jan. 17-21, 2011. R3-110084.

$3^{rd}$ Generation Partnership Project, "Technical Specification Group Services and System Aspects; Telecommunication Management; Performance Management (PM); Performance Measurements Evolved Universal Terrestrial Radio Access Network (E-UTRAN)" (Release 8) 3GPP TS 32.425. V0.1.3, Jul. 2008.

Qualcomm et al., "OAM Requirements for Configuration of Ranges of HO Parameters for MRO" Agenda Item 16.3, 3GPP TSG-RAN WG3 #70. Jacksonville, USA, Nov. 15-19, 2010. R3-103412.

Huawei, "Intra-Frequency Handover Measurements" Agenda Item 6.5.3, 3GPP TSG-SA5 (Telecom Management) Meeting SA5#59/ Chengdu, China, Apr. 21-25, 2008. S5-080659.

$3^{rd}$ Generation Partnership Project, "Technical Specification Group (TSG) RAN: Utran Functions, Examples on Signalling Procedures" TR 25.931, V1.0.0, Apr. 1999.

\* cited by examiner

METHOD FOR DETERMINING HANDOVER CRITERION IN A CELLULAR WIRELESS COMMUNICATION SYSTEM

CROSS-REFERENCE TO RELATED APPLICATIONS

This application is a continuation of International Application No. PCT/CN2011/076792, filed on Jul. 4, 2011, which claims priority to International Application No. PCT/SE2010/000318, filed on Dec. 23, 2010, both of which are hereby incorporated by reference in their entireties.

TECHNICAL FIELD

The present invention relates to a method for determining handover criterion in a cellular wireless communication system, or more particularly to a method according to the preamble of claim 1. Furthermore, the invention also relates to a method in a network control entity, a method in a network entity, a computer program, a computer program product, a network control entity device, a network entity device and a cellular communication system comprising such devices.

BACKGROUND OF THE INVENTION

Normally a Mobile Station (MS) in active mode in a cellular wireless communication system is handed over from one cell to the next as it moves through the system, and data can be transmitted and received without significant interruptions due to these handovers.

A handover (HO) procedure can consist of many steps. In many cellular wireless communication systems a HO is: 1) network controlled, i.e. the MS is commanded by the network when to connect to another cell; 2) prepared, i.e. the target cell to which the MS is moving to is prepared; and 3) MS assisted, i.e. the MS provides measurement reports before HO to the serving cell to assist the decision to do HO preparation of target cell(s), and when to leave the serving cell/connect to the target cell.

In the context of HO, the serving cell before HO is often referred to as the source cell. After successful HO the target cell becomes the new serving cell. In Long Term Evolution (LTE) the HO is a "hard handover", which means that the UE radio link is switched from one (source) cell to another (target) cell. In Universal Mobile Telecommunications System (UMTS) hard HOs are used exclusively for TDD mode, but may also be used for FDD mode.

In the following discourse, the focus is on the intra frequency LTE HO procedure, but the procedures are similar for the LTE inter Radio Access Technology (RAT) and LTE inter frequency HO procedures. The intra E-UTRAN in RRC_CONNECTED state is a User Equipment (UE) assisted network controlled HO, with HO preparation signalling in E-UTRAN.

A HO is initially triggered by a measurement report sent from a UE to a serving base station, such as an eNB (E-UTRAN NodeB). The serving eNB configures how the UE shall take measurements, and under what conditions a measurement report shall be triggered and sent to the eNB.

To assist mobility control decisions, the UE can measure several different cells and report the results to the network. Different networks and network deployments can have different detailed behaviour, but in most systems it is natural to trigger HO when signal reception from a target cell is better than from a source cell.

For the case of intra-frequency HO in a reuse-one system (i.e. in a system where the source cell and the target cell uses exactly the same frequency resources) there are strong interference management benefits in (always) keeping the UE connected to the cell with the best signal strength. In the measurement report, the UE includes the reason for the trigger of a HO, e.g. target cell signal stronger than serving cell signal, and measurements of a Reference Signal Received Power (RSRP) or Reference Signal Received Quality (RSRQ) of the serving cell and several neighbour cells including the target cell. To reduce ping-pong effects where a UE is handed over repeatedly between two cells a HO offset is often added to the HO trigger condition: target cell signal should be better than the serving cell signal by an offset, wherein the offset value >0 dB. FIG. 1 shows a typical scenario in which a UE performs mobility measurements.

When a serving eNB receives a measurement report from a UE, the eNB shall first decide whether a HO shall take place or not. This decision can be based on a single or on multiple UE measurement reports, but also on other information available in the eNB, such as information about the subscriber, UE capabilities, etc. If the eNB wishes to HO the UE to another cell, the eNB performs a HO preparation to that cell. HO preparation involves a signalling exchange between one (serving) eNB and another (target) eNB. The source cell requests the HO (Handover Request) and passes over UE context information; and the target cell decides if it can admit the UE (Call Admission Control) and either accepts or rejects the HO. In an acceptance message (Handover Request Ack), the target cell includes parameters required by the UE to allow it to communicate to the target cell—these parameters being grouped into a transparent container. The source cell may prepare multiple cells for HO.

Following a successful preparation, the HO execution takes place. The source cell issues a HO Command to the UE—this is the RRCConnectionReconfiguration message and carries the transparent container. If, and when, the UE receives this message correctly the UE synchronises to the new target cell and sends a synchronisation message on the Random Access Channel (RACH). The target cell then issues an allocation to the UE so that the UE can send a HO confirmation message to the target cell (RRCConnectionReconfiguration-Complete message).

In the final steps (Handover Completion), which do not involve the UE, the source eNB (serving the source cell) is able to forward data (un-acknowledged downlink packets) to the target eNB (serving the source cell), and the S1-U interface from the Serving Gateway (S-GW) must be switched from the source to the target cell ("path switch"). Finally, if the HO is successful, the target eNB issues a UE Context Release message to the source eNB.

The hard HO in UMTS is very similar in many respects—it is also UE assisted but network controlled (i.e. the UE is configured to send triggered measurement reports but the network decides when to execute a HO), exploits preparation (using RL Setup procedure), is a "backward" HO which means that the source cell sends the HO command to the UE and the UE replies to the target cell, and is completed by inter-node signalling.

Moreover, in 3GPP there has been considerable study into Self-Organising Networks (SON) for LTE. One part of this is the HO Parameter Optimisation also known as the above mentioned MRO which is aiming at optimising mobility parameters. The intention is to optimise the HO behaviour, for example by adjusting the measurement configuration of the UE or by adjusting the behaviour of the HO decision algorithm. It has not been specified which HO parameters shall be optimised, but examples include the HO hysteresis (also called offset) and the Time-to-Trigger (TTT) parameters. The aims of the optimisation are to reduce HO failures whilst at the same time not having more HOs than are necessary. The MRO functionality is distributed in the Evolved-UTRAN (E-UTRAN), i.e. every eNB has its own MRO optimisation function. To assist optimisation, signalling has also been defined between eNBs to help identify HO failure events.

The following is the text describing the use-case of HO Parameter Optimisation also known as MRO in section 22.5 of specification 3GPP TS36.300, 9.2.0:

One of the functions of Mobility Robustness Optimization [MRO] is to detect RLFs that occur due to Too Early or Too Late Handovers, or Handover to Wrong Cell. This detection mechanism is carried out through the following procedures:

[Too Late HO] If the UE attempts to re-establish the radio link at eNB B after a RLF at eNB A then eNB B may report this RLF event to eNB A by means of the RLF Indication Procedure.

[Too Early HO] eNB B may send a HANDOVER REPORT message indicating a Too Early HO event to eNB A when eNB B receives an RLF Indication from eNB A and if eNB B has sent the UE Context Release message to eNB A related to the completion of an incoming HO for the same UE within the last Tstore_UE_cntxt seconds.

[HO to Wrong Cell] eNB B may send a HANDOVER REPORT message indicating a HO To Wrong Cell event to eNB A when eNB B receives an RLF Indication from eNB C, and if eNB B has sent the UE Context Release message to eNB A related to the completion of an incoming HO for the same UE within the last Tstore_UE_cntxt seconds. The indication may also be sent if eNB B and eNB C are the same and the RLF report is internal to this eNB.

The detection of the above events is enabled by the RLF Indication and Handover Report procedures.

The RLF Indication procedure may be initiated after a UE attempts to re-establish the radio link at eNB B after a RLF at eNB A. The RLF INDICATION message sent from eNB B to eNB A shall contain the following information elements:

Failure Cell ID: PCI of the cell in which the RLF occurred;

Reestablishment Cell ID: ECGI of the cell where RL re-establishment attempt is made;

C-RNTI: C-RNTI of the UE in the cell where RLF occurred.

shortMAC-I (optionally): the 16 least significant bits of the MAC-I calculated using the security configuration of the source cell and the re-establishment cell identity.

eNB B may initiate RLF Indication towards multiple eNBs if they control cells which use the PCI signalled by the UE during the re-establishment procedure. The eNB A selects the UE context that matches the received Failure cell PCI and C-RNTI, and, if available, uses the shortMAC-I to confirm this identification, by calculating the shortMAC-I and comparing it to the received IE.

The Handover Report procedure is used in the case of recently completed handovers, when an RLF occurs in the target cell (in eNB B) shortly after it sent the UE Context Release message to the source eNB A. The HANDOVER REPORT message contains the following information:

Type of detected handover problem (Too Early HO, HO to Wrong Cell)

ECGI of source and target cells in the handover

ECGI of the re-establishment cell (in the case of HO to Wrong Cell)

Handover cause (signalled by the source during handover preparation)

MRO is expected to meet a specified HO failure rate target, and to minimize the number of HO events whilst meeting this failure rate target. In this respect, the need to control MRO behaviour is important. By controlling the MRO, the system operator can control the behaviour depending on deployment phase and possibly also depending on the performance and/or stability of the MRO algorithms for different eNBs. The relationship between OAM, MRO HO algorithm, and the UE is depicted in FIG. 2. In this figure, it is shown that the OAM controls the MRO, which in turn controls the HO algorithm thereby controlling the UE behaviour by controlling the measurement configuration for the UE.

It has been suggested to let the OAM directly control the automatic optimization of mobility parameters in the eNB by specifying restrictions on the output parameters of the MRO function (measurement configuration). The following parameters have been suggested to be controlled: Hysteresis, TTT and Cell Individual Offset (CIO). This can be summarized as a solution where the OAM selects a set of valid parameters and the eNB (or MRO) selects one of these parameters.

However, problems with prior art are that different eNBs may choose to have different behaviour of the HO algorithm, using different measurement configurations and different input used for the HO decision. If an operator uses OAM to control the output of the HO algorithm, it assumes that the operator has a detailed knowledge about the algorithm using the output parameters, i.e. the HO algorithm. By restricting the range of the measurement configuration parameters there is a risk that it may limit the performance of the proprietary HO and MRO algorithms.

In order to avoid such a situation, the network entity modifying the parameters needs to have a detailed knowledge about the actual implementation of the HO algorithm. This further requires that in a network comprising network equipment from multiple providers, there is a need to set different working points and ranges for equipment from different vendors. Also, different vendors may let the MRO and HO algorithms modify different HO parameters so the network operator also needs to understand in detail which HO parameters should have their range controlled. For example, vendor A may let the MRO and HO algorithm only adjust the CIO parameter, whilst vendor B may modify the TTT parameter. Vendor C may modify both CIO and TTT but certain pairs of values within the total set of paired values formed from the specified permitted ranges for CIO and for TTT may be excluded by the proprietary MRO or HO algorithm in the eNB since these pairs of values are considered as not beneficial. For example, CIO may take values −3 and −4, and TTT 0 and 160 ms, but {CIO, TTT} values {−3, 0}, {−3, 160} and {−4, 0} would be valid but not {−4, 160}. If OAM should control the output of the HO algorithm, this would more or less create a need for transparency between OAM all the way to the measurement configuration.

There is therefore a need for an improved method in the art which mitigates and/or solves the disadvantages with prior art solutions.

SUMMARY OF THE INVENTION

The object of the present invention is to provide a method which mitigates and/or solves the disadvantages of prior art solutions, and more specifically to a method which removes the need for knowledge of how MRO and HO algorithms are implemented in network entities. Thereby controlling network entities having different implementations is made easier.

Another object of the invention is to provide a method which provides good HO performance in cellular wireless communication systems comprising network entities with different MRO and HO algorithms implementations.

According to one aspect of the invention, the objects are achieved with a method for determining handover criterion in a cellular wireless communication system, said cellular wireless communication system employing handover procedures according to which mobile stations may be handed over from a cell to another cell; said method comprising the steps of:

receiving at least one handover control criterion parameter, and determining at least one handover criterion based on said at least one handover control criterion parameter.

Embodiments of the method in a cellular wireless communication system above are disclosed in the dependent claims 2-17.

According to another aspect of the invention, the objects are also achieved with a method in a network control entity for a cellular wireless communication system, said cellular wireless communication system employing handover procedures according to which mobile stations may be handed over from a cell to another cell; said method comprising the steps of:

defining at least one handover control criterion parameter; and providing said at least one handover control criterion parameter to a network entity in said cellular wireless communication system.

According to yet another aspect of the invention, the objects are also achieved with a method in a network entity configured to process mobility parameters in a cellular wireless communication system, said cellular wireless communication system employing handover procedures according to which mobile stations may be handed over from a cell to another cell; said method comprising the steps of:

receiving at least one handover control criterion parameter; and determining at least one handover criterion based on said at least one handover control criterion parameter.

The method in a network control entity and the method in a network entity may be modified according to different embodiments of the method in the cellular wireless communication system.

The invention also relates to a computer program and a computer program product when run in a computer causes the computer to execute the methods described above.

According to yet another aspect of the invention, the objects are also achieved with a network control entity device for a cellular wireless communication system, said cellular wireless communication system employing handover procedures according to which mobile stations may be handed over from a cell to another cell; further being configured to:

define at least one handover control criterion parameter; and provide said at least one handover control criterion parameter to a network entity in said cellular wireless communication system.

According to yet another aspect of the invention, the objects are also achieved with a network entity device configured to process mobility parameters in a cellular wireless communication system, said cellular wireless communication system employing handover procedures according to which mobile stations may be handed over from a cell to another cell; further being configured to:

receive at least one handover control criterion parameter; and determine at least one handover criterion based on said at least one handover control criterion parameter.

The network control entity device and the network entity device according to the invention may also be arranged according to the different embodiments of any of the methods above.

The invention also relates to a cellular wireless communication system comprising at least one such device.

The present invention removes the need for detailed knowledge of the internal MRO and HO algorithms in the network entity (such as a base station) for the system operator controlling these MRO and HO algorithms through a network control entity, such as OAM.

The operator can instead focus on defining the relative range in terms of HO decision, thereby controlling the behaviour of the network entity, such as an eNB, without knowing the details of the network entity internal implementation of the MRO and HO algorithms. This has the advantage that the operator can control the behaviour for different implementations of the MRO and HO algorithms in a similar way, making configuration of the behaviour an easier task, not having to consider different implementations for different network entities.

Further, the present solution reduces the risk of hampering the performance of the HO optimisation by removing the possibility of selecting output ranges that are not suitable for this specific implementation or scenario, or by selecting output ranges in which only certain combinations of values are suitable for this specific implementation or scenario.

Other advantages and applications of the present invention will be apparent from the following disclosure.

BRIEF DESCRIPTION OF THE DRAWINGS

The appended drawings are intended to clarify and explain different embodiments of the present invention in which.

DETAILED DESCRIPTION OF THE INVENTION

For the above reasons, the present invention relates to a method for determining HO criterion in a cellular wireless communication system. The method comprises the steps of receiving a HO control criterion parameter, and determining at least one HO criterion based on the received HO control criterion parameter.

The HO criterion is the criterion defining when the network entity shall decide to perform a HO for a certain mobile station (such as an UE) in the cellular system, and the HO control criterion parameter is a parameter defining the allowed HO criterion that can be used by the network entity. Hence, the network entity can choose to use any HO criterion as long as it fulfils the HO control criterion parameter. For example, a network control entity controlling a network entity sends a HO control criterion parameter to the network entity, and the network entity is free to define the actual HO criterion to be used as long as it is allowed according to the HO control criterion parameter sent by the network control entity.

Preferably, the HO control criterion parameter is defined and provided by a one network control entity by means of transmission to a network entity which is configured to process mobility parameters for HO procedures for UEs in the system. Accordingly, the network entity may be configured to determine the HO criterion based on the received HO control criterion parameter, and using the HO criterion for HO execution decision.

The network control entity is preferably any of OAM entity, NMS entity, EMS entity or any other suitable entity with the required capabilities. The network entity is preferably integrated in a base station (such as an eNB in a LTE system) or in a base station controller or in a Radio Network Controller (RNC). Further, mentioned base station or base station controller or RNC are configured to be responsible for initiating HO procedures in a cell associated with the same.

Thereby a solution is provided by the invention where a network entity, such as a MRO, is controlled from a network control entity (e.g. a OAM) that is independent of implementation specific MRO and mobility algorithms. The advantage with such a solution is that by using the same HO control criterion parameter network entities implemented and configured in different ways may be controlled to behave in the same way.

It shall be understood that the invention is also applicable to idle mode (cell reselection) as well as active mode (handover) mobility. Thus MRO may be controlled in how it adjusts idle mode cell reselection timing, either directly or indirectly according to control of the active mode mobility.

Other considerations of the invention are e.g. how OAM controls MRO using trigger based HO in the signal strength domain, timing based HO according to timing parameters, or combinations thereof.

Figure 1:
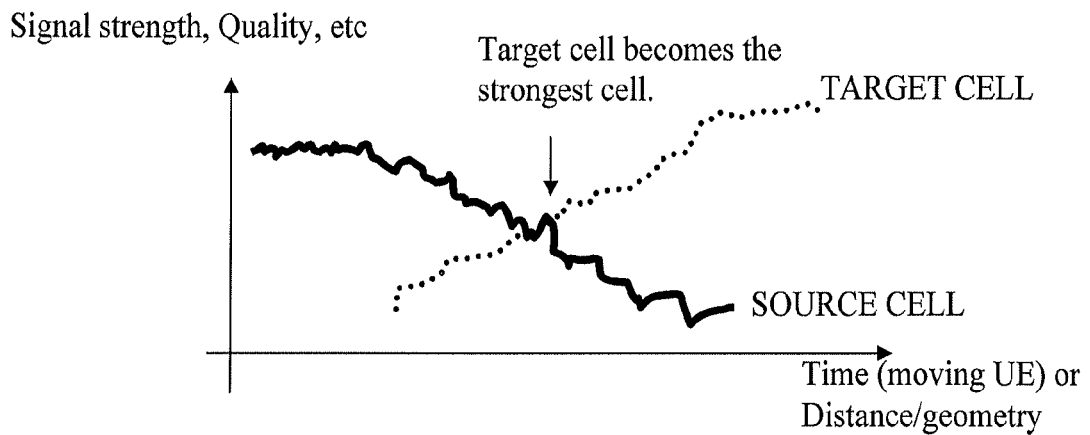
FIG. 1 shows a typical cell scenario with cell measurement.
Figure 2:
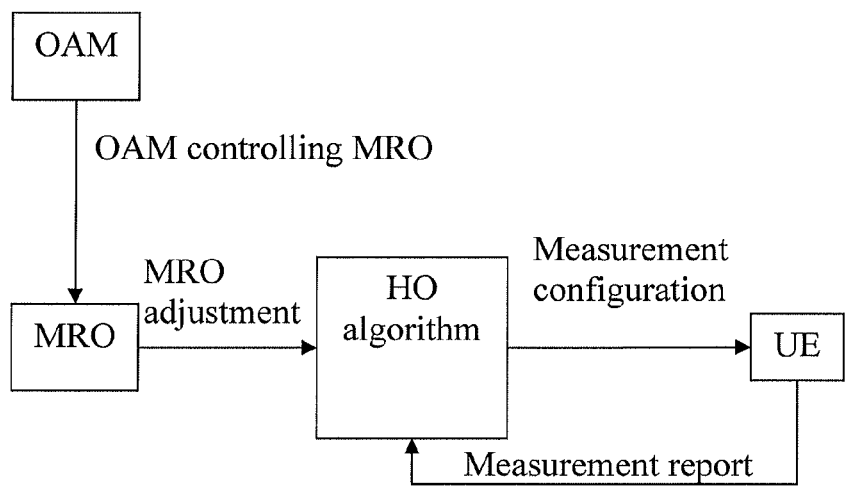
FIG. 2 illustrates the relationship between OAM, MRO, HO algorithm and UE in a cellular communication system.
Figure 3:
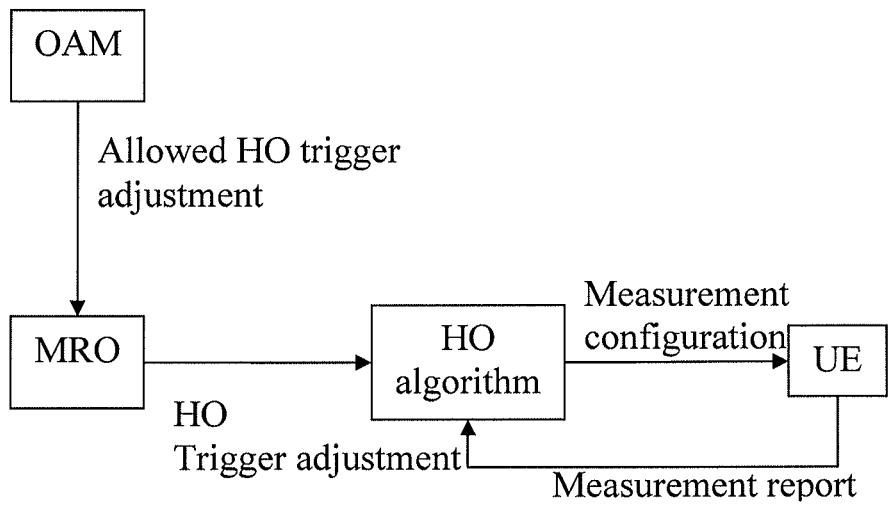
FIG. 3 illustrates using HO trigger adjustment to control MRO from OAM.
Figure 4:
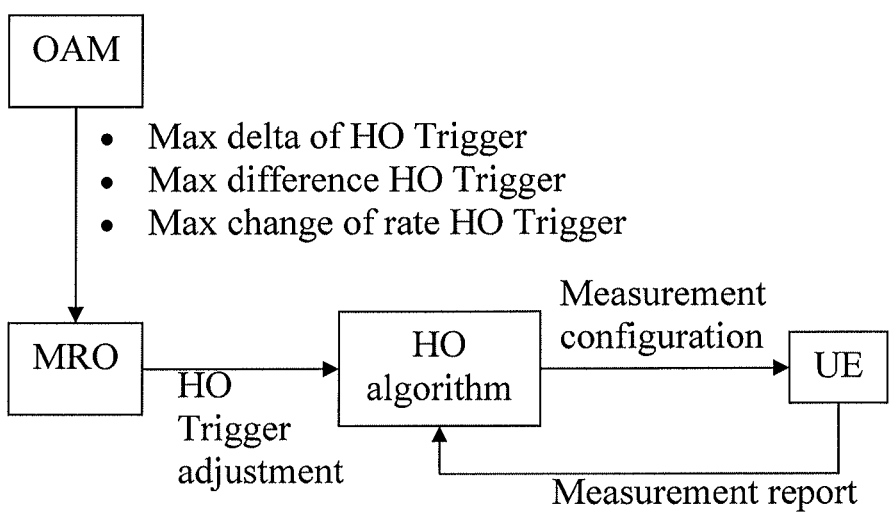
FIG. 4 illustrates using allowed adjustment range in the signal strength domain.

With reference to FIG. 4, the present invention may according to a preferred embodiment be implemented in a LTE communication system as follows:
1. Use an existing OAM (i.e. a network control entity) mechanism to define a default mobility parameter setting(s); and
2. Define how much a MRO (i.e. a network entity) is allowed to modify the mobility parameters in terms of their impact on the HO trigger condition, either:
   a. In the signal strength domain, re-using an existing definition of "handover trigger" defined from 3GPP for mobility load balancing (please see below);
   b. In the time domain, using a new definition that applies to HO parameters that directly influence the time of the trigger point; or
   c. Using a combination of (a) and (b) above.
3. Letting the network entity (e.g. by an HO algorithm) decide how to perform the necessary adjustments of the algorithm behaviour and UE behaviour, e.g. through measurement configuration.

HO trigger has been defined as: "is the cell specific offset that corresponds to the threshold at which a cell initialises the handover preparation procedure", which therefore is expressed by the means of a difference (delta) between the current and the new values of the HO trigger. This definition may be used when defining how to control a network entity from a network control entity according to the invention.

In the scope of SON requiring exchange of mobility parameters between eNBs, the need to exchange modifications of HO characteristics was agreed, but instead of controlling the measurement configuration parameters, a relative adjustment was used, referring to a more abstract "handover trigger".

Signal Strength Domain Parameters

According to an embodiment of the invention the HO criterion is a HO trigger value and preferably the HO control criterion parameter defines an allowed interval for the HO trigger value. Therefore, the HO control criterion parameter comprises at least one threshold value used to define the allowed interval. This is a signal strength domain parameter since it directly relates to measurements performed in the signal strength domain. There are also other parameters related to the time domain, for example requiring that a certain condition should be fulfilled during a certain time, which is explained below.

Accordingly, the threshold value may be any in the group comprising: maximum value of a HO trigger, maximum change of a HO trigger, maximum difference between HO triggers for neighbouring cells, and maximum rate of change for a HO trigger according to another embodiment.

The above mentioned three control parameters may be defined as depicted in FIG. 4:

Max delta of HO trigger: this is the maximum allowed change of the HO trigger, from the default point of operation defined by the parameter values assigned by the OAM;

Max difference HO trigger: this is the maximum difference between HO trigger used for different neighbour cells which is used to limit the individual difference between neighbours to avoid effects occurring when the offset to different neighbours are large; and Max change rate HO trigger: this parameter limits the rate of change and can therefore be used to either increase the stability of the algorithm or reduce the time it takes for the system to find it's optimum value. This parameter is used to control the stability and convergence of the HO algorithm.

HO trigger is in many systems measured in dB, so this approach applies directly to HO parameters that impact the signal strength measurements, such as the CIO or hysteresis value (Hys). However, an implementation could adjust other parameters impacting the timing of the HO (such as the TTT) so that the HO takes place when the signal strength (or signal strength difference) has changed by a number of dB.

Time Domain Parameters

The embodiments above relate to the signal strength aspect, but there is also a timing aspect which may be considered in this respect.

Therefore, according to another embodiment of the invention, the HO control criterion parameter may comprise at least one timing parameter, which preferably is a timing threshold value defining an allowed interval for the HO criterion.

The timing parameter may relate to any in the group comprising: maximum allowed relative change of HO timing, or maximum rate of change for HO timing. These parameters may be defined as:
1. Max delta of HO timing: this parameter defines, in relative terms, how much HO timing is allowed to change compared to a default point of operation defined by the parameter values assigned by the OAM;
2. Max difference HO timing: this parameter defines the maximum difference between HO timing used for different neighbour cells which is used to limit the individual difference between neighbours to avoid effects occurring when the offset to different neighbours are large; and
3. Max change rate HO timing: this parameter limits the rate of change and thereby can be used to either increase the stability of the HO algorithm or reduce the time it takes for the system to find it's optimum value.

Examples of HO parameters that directly influence the timing are TTT and the RSRP measurement filter time constant.

Further, as stated above one of the mobility parameters directly reflecting the time domain is the TTT parameter. The allowed range for this parameter is defined in TS 36.331 as: [0, 40, 64, 80, 100, 128, 160, 256, 320, 480, 512, 640, 1024, 1280, 2560, 5120] ms. Obviously, this range is not linear, and it may therefore be difficult to specify a suitable threshold for defining a valid range for this parameter.

One possible solution is however that the OAM defines the starting point (default value) and then the OAM specify the valid range by indicating how many steps or an index value in the defined range the network entity is allowed to adjust the TTT parameter. Hence, instead of signalling the allowed range in terms of time, e.g. in ms, the OAM define it as steps in the allowed range or allowed index positions in the list of valid values. In summary, the timing parameter indicates number of allowed steps or an index value defining an allowed interval based on a predefined interval for the HO criterion, and preferably, the predefined interval is an interval defined for a measurement control parameter, such as a TTT parameter. The advantage of referring to the pre-defined allowed range of TTT is that the system can better control the non-linear range of the TTT parameter. If a linear scale is used, there is no point in differentiating between values of for example [320, 350, 370, . . . 480], since the values that are allowed to be used in this range is anyway limited to only 320 or 480.

Combinations of Signal Strength Domain and Time Domain Parameters

The impact of the timing of the HO trigger point from the adjustments permitted in the signal strength domain is dependent upon the expected variation of signal strength with time. If serving and neighbouring signal strengths change very rapidly at the cell edge during a HO then changes in, for example, changing parameters in the signal strength domain will have a very minor impact on when the HO decision is taken when looking at the actual geographic position for the UE when the decision is taken. This argues for a use of the time domain ranges, as described above. An alternative approach would be to allow all HO parameters to be managed by controlling the change of trigger timing. Thus, the eNB would be free to change both signal domain and time domain parameters such that the timing of the HO stayed within specified bounds.

One solution for this would be that the eNB continuously stores reported mobility measurements to get a view on the typical radio conditions in the cell and creates a statistical model of the relationship between the time and signal strength domain.

In accordance with example embodiments of the invention, it is possible to control the behaviour of a network entity (MRO) from a control network entity (OAM). Furthermore, it is also possible to use the same range to achieve the same control affect independent of vendor specific MRO and mobility algorithms.

Figure 5:
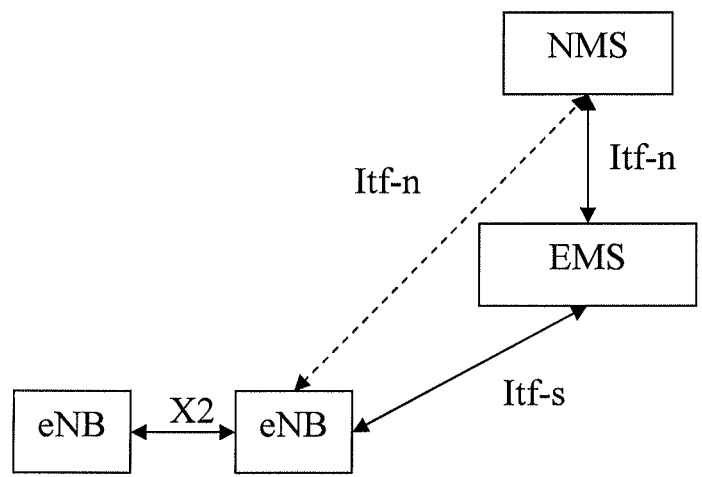
FIG. 5 shows an example of system architecture.

In previous sections, the general term OAM have been used as the network control entity controlling the network entity (eNB). In LTE, the OAM functionality for controlling the eNB can be performed by the Element Management Systems (EMS) or the Network Management System (NMS). FIG. 5 illustrates some interfaces for a radio base station (such as eNB) to other network nodes in the system. X2 is the interface used in LTE for connection of a radio base station to one or more other radio base stations. $I_{tf-S}$ is the interface towards the EMS and $i_{tf-N}$ is the interface between the EMS and the NMS. It has also been suggested to enable the direct connection from NMS to the eNB using the $i_{tf-N}$ interface.

Figure 6:
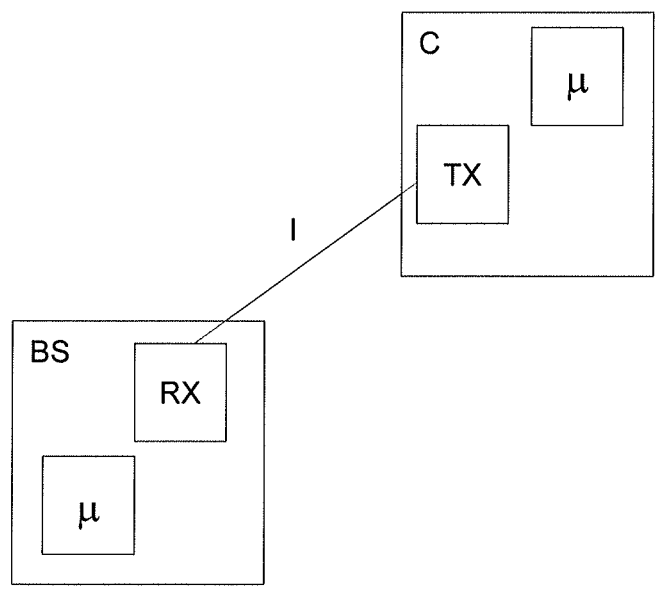
FIG. 6 shows an example of system network entities.

FIG. 6 illustrates an example central network control entity, C, such as an OAM entity, NMS entity or EMS entity, or other network entity other than a base station, and an example base station, BS. The central network control entity and the base station entity are capable of communicating across an interface, I. The example central network control entity comprises processing equipment, □, capable of controlling a base station HO criterion and sending circuitry, TX, capable of sending one or more HO control criterion parameters, such as threshold values. The central network control entity is generally connected over at least one interface to a plurality of elements of which it provides control. The example base station comprises receiving circuitry, RX, capable of receiving one or more HO control criterion parameters, such as the one or more HO control criterion parameters provided by the sender, TX, and processing equipment of determining a HO criterion on the basis of the respective received one or more HO control criterion parameters, such as not exceeding a threshold value, incremental or relative change not exceeding a threshold value, or time-dynamics or change-rate not exceeding a particular threshold value.

Furthermore, the invention relates to a method in a network control entity for a cellular wireless communication system. The method comprises the steps of: defining at least one handover control criterion parameter; and providing the at least one handover control criterion parameter to a network entity.

The invention also relates to a complementary method in a network entity configured to process mobility parameters in a cellular wireless communication system. The method comprises the steps of receiving at least one handover control criterion parameter; and determining at least one handover criterion based on the at least one handover control criterion parameter.

According to an embodiment, the least one handover control criterion parameter is received from a network control entity which is configured to define the at least one handover control criterion parameter. Preferably, the network entity is a MRO entity which may be integrated in a base station or in a base station controller or in a RNC.

Moreover, the invention also relates to a network control entity device and a network entity device corresponding to the above methods.

It is realised by the skilled person that the mentioned devices may be modified, mutatis mutandis, according to different embodiments of the methods in the description. The invention further relates to a cellular wireless communication system comprising at least one network control entity and/or at least one network entity as defined above.

Furthermore, as understood by the person skilled in the art, a method according to the present invention may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Finally, it should be understood that the present invention is not limited to the embodiments described above, but also relates to and incorporates all embodiments within the scope of the appended independent claims.

The invention claimed is:

1. A method for determining handover criterion in a cellular wireless communication system, comprising:
   receiving, by a network entity in the cellular wireless communication system, at least one handover control criterion parameter, and
   determining, by the network entity, at least one handover criterion based on said at least one handover control criterion parameter;
   wherein said at least one handover criterion is a handover trigger value;
   wherein said at least one handover control criterion parameter defines an allowed interval for said handover trigger value;
   wherein said at least one handover control criterion parameter comprises at least one threshold value used to define said allowed interval; and
   wherein said at least one handover control criterion parameter further comprises setting at least one threshold value used to define a maximum change rate of the handover trigger value, wherein the maximum change rate of the handover trigger value defines a maximum allowed frequency at which the handover trigger value is changed, and the handover trigger value is a cell specific offset that corresponds to a threshold at which a cell initializes a handover preparation procedure.

2. The method according to claim 1, further comprising: providing, by at least one network control entity, said at least one handover control criterion parameter.

3. The method according to claim 2, further comprising: defining, by said least one network control entity, said at least one handover control criterion parameter.

4. The method according to claim 3, wherein said least one network control entity comprises at least one of the following: Operations and Maintenance (OAM) entity, Network Management System (NMS) entity, and Element Management System (EMS) entity.

5. The method according to claim 1, wherein said at least one handover criterion is used by the network entity for handover execution decision.

6. The method according to claim 1, wherein the network entity is integrated in one of the following: a base station, a base station controller, and a radio network controller (RNC), said base station or said base station controller or said radio network controller (RNC) being configured to initiate the handover preparation procedure in the cell associated with said at least one base station or said base station controller or said radio network controller (RNC).

7. The method according to claim 1, wherein said at least one handover control criterion parameter comprises at least one timing parameter.

8. The method according to claim 7, wherein said at least one timing parameter is a timing threshold value defining an allowed interval for said handover criterion.

9. The method according to claim 7, wherein said at least one timing parameter indicates a number of allowed steps or an index value defining an allowed interval based on a predefined interval for said handover criterion.

10. The method according to claim 9, wherein said predefined interval is an interval defined for a measurement control parameter.

11. The method according to claim 7, wherein said at least one timing parameter relates to any in the group comprising: maximum allowed relative change of handover timing, maximum difference between handover timing used for different neighbour cells, and maximum change rate for handover timing.

12. A method in a network control entity for a cellular wireless communication system, comprising:
   defining, by a network control entity in the cellular wireless communication system, at least one handover control criterion parameter corresponding to at least one handover criterion; and
   providing, by the network control entity, said at least one handover control criterion parameter to a network entity in said cellular wireless communication system;
   wherein said at least one handover criterion is a handover trigger value;
   wherein said at least one handover control criterion parameter defines an allowed interval for said handover trigger value; and
   wherein said at least one handover control criterion parameter comprises at least one threshold value used to define said allowed interval;
   wherein said at least one handover control criterion parameter further comprises setting at least one threshold value used to define a maximum change rate of the handover trigger value, wherein the maximum change rate of the handover trigger value defines a maximum allowed frequency at which the handover trigger value is changed, and the handover trigger value is a cell specific offset that corresponds to a threshold at which a cell initializes a handover preparation procedure.

13. The method according to claim 12, wherein the providing said at least one handover control criterion parameter to the network entity in said cellular wireless communication system comprises:
   transmitting said at least one handover control criterion parameter to said network entity, wherein said network entity is configured to process mobility parameters in said cellular wireless communication system.

14. The method according to claim 12, wherein said network control entity comprises at least one of the following: Operations and Maintenance (OAM) entity, Network Management System (NMS) entity and Element Management System (EMS) entity.

15. The method according to claim 12, wherein said at least one handover criterion is used by said at least one network entity for handover execution decision.

16. The method according to claim 12, wherein said at least one handover control criterion parameter comprises at least one timing parameter.

17. The method according to claim 16, wherein said at least one timing parameter is a timing threshold value defining an allowed interval for said handover criterion.

18. The method according to claim 16, wherein said at least one timing parameter indicates a number of allowed steps or an index value defining an allowed interval based on a predefined interval for said handover criterion.

19. The method according to claim 18, wherein said predefined interval is an interval defined for a measurement control parameter, such as a Time to Trigger (TTT) parameter.

20. A network control entity device for a cellular wireless communication system, said network control entity device being configured to
   define at least one handover control criterion parameter corresponding to at least one handover criterion; and
   provide said at least one handover control criterion parameter to a network entity in said cellular wireless communication system;

wherein said at least one handover criterion is a handover trigger value;

wherein said at least one handover control criterion parameter defines an allowed interval for said handover trigger value; and wherein said at least one handover control criterion parameter comprises at least one threshold value used to define said allowed interval;

wherein said at least one handover control criterion parameter further comprises setting at least one threshold value used to define a maximum change rate of the handover trigger value, wherein the maximum change rate of the handover trigger value defines a maximum allowed frequency at which the handover trigger value is changed, and the handover trigger value is a cell specific offset that corresponds to a threshold at which a cell initializes a handover preparation procedure.

21. The network control entity device according to claim 20, wherein said network control entity comprises at least one of the: Operations and Maintenance (OAM) entity, Network Management System (NMS) entity and Element Management System (EMS) entity.

22. A network entity device configured to process mobility parameters in a cellular wireless communication system, said network entity device being configured to:

receive at least one handover control criterion parameter; and determine at least one handover criterion based on said at least one handover control criterion parameter;

wherein said at least one handover criterion is a handover trigger value;

wherein said at least one handover control criterion parameter defines an allowed interval for said handover trigger value; and wherein said at least one handover control criterion parameter comprises at least one threshold value used to define said allowed interval;

wherein said at least one handover control criterion parameter further comprises setting at least one threshold value used to define a maximum change rate of the handover trigger value, wherein the maximum change rate of the handover trigger value defines a maximum allowed frequency at which the handover trigger value is changed, and the handover trigger value is a cell specific offset that corresponds to a threshold at which a cell initializes a handover preparation procedure.

23. The network entity device according to claim 22, wherein said network entity is integrated in one of the following: a base station, a base station controller, and a radio network controller (RNC).

* * * * *